United States Patent
Cox

(10) Patent No.: US 10,538,282 B2
(45) Date of Patent: Jan. 21, 2020

(54) APPARATUS ARRANGED FOR CONVERTING A WHEELED VEHICLE TO A TRACKED VEHICLE

(71) Applicant: Moorend Ltd, Gloucestershire (GB)

(72) Inventor: Andrew Cox, Gloucester (GB)

(73) Assignee: Moorend Ltd., Gloucestershire (GB)

( * ) Notice: Subject to any disclaimer, the term of this patent is extended or adjusted under 35 U.S.C. 154(b) by 0 days.

(21) Appl. No.: 16/015,549

(22) Filed: Jun. 22, 2018

(65) Prior Publication Data

US 2018/0297652 A1 Oct. 18, 2018

Related U.S. Application Data

(63) Continuation-in-part of application No. 15/550,666, filed as application No. PCT/GB2016/050350 on Feb. 12, 2016.

(30) Foreign Application Priority Data

Feb. 13, 2015 (GB) .................................. 1502475.5

(51) Int. Cl.
 *B62D 55/084* (2006.01)
 *B66F 9/075* (2006.01)
 (Continued)

(52) U.S. Cl.
 CPC .......... *B62D 55/084* (2013.01); *B62D 55/02* (2013.01); *B66F 9/0655* (2013.01);
 (Continued)

(58) Field of Classification Search
 CPC . B62D 55/04; B62D 55/0655; B62D 49/0635
 See application file for complete search history.

(56) References Cited

U.S. PATENT DOCUMENTS 3,435,908 A * 4/1969 Sunderlin ............ B62D 53/062
 172/811
3,810,524 A * 5/1974 Dransfield ............... G01V 1/09
 181/114
(Continued)

FOREIGN PATENT DOCUMENTS

EP 2448809 A1 1/2011
EP 2610143 A1 7/2013
(Continued)

OTHER PUBLICATIONS

UK Intellectual Property Office, Patents Act 1977: Search Report Under Section 17(5), Great Britain Patent Application GB1502475.5, dated Feb. 4, 2016.
(Continued)

*Primary Examiner* — Joseph M Rocca
*Assistant Examiner* — Marlon A Arce
(74) *Attorney, Agent, or Firm* — Reichel Stohry Dean LLP; Natalie J. Dean; Mark C. Reichel

(57) ABSTRACT

Apparatus arranged for converting a wheeled vehicle to a tracked vehicle by attachment of a continuous track unit, the vehicle comprising a drive hub of the type which is arranged to have an attachable wheel, the continuous track unit replacing the wheel to engage ground in use for movement of the vehicle, the apparatus comprising a mounting portion releasably attachable to the vehicle's chassis, the mounting portion arranged to substantially surround the drive hub, a support arm for supporting the continuous track unit, and a drive sprocket releasably attachable to the drive hub for transferring torque from the drive hub to the continuous track unit so as to rotate the track in use with the wheel removed and the apparatus attached to the vehicle.

18 Claims, 11 Drawing Sheets

(51) Int. Cl.
  *B66F 9/065* (2006.01)
  *B62D 55/02* (2006.01)
  *B62D 55/065* (2006.01)
  *B62D 11/20* (2006.01)
(52) U.S. Cl.
  CPC .......... *B66F 9/07577* (2013.01); *B62D 11/20* (2013.01); *B62D 55/065* (2013.01); *B62D 55/0655* (2013.01)

(56) References Cited

U.S. PATENT DOCUMENTS

| | | | | |
|---|---|---|---|---|
| 3,826,388 | A * | 7/1974 | Oldenburg | E02F 3/3411 180/9.44 |
| 4,953,919 | A * | 9/1990 | Langford | B62D 55/06 305/131 |
| 5,273,126 | A * | 12/1993 | Reed | B62D 49/0635 180/9.21 |
| 5,607,210 | A * | 3/1997 | Brazier | B62D 55/04 305/131 |
| 5,954,148 | A * | 9/1999 | Okumura | B62D 55/04 180/9.21 |
| 6,164,399 | A * | 12/2000 | Bays | B62D 55/0655 180/9.21 |
| 6,199,646 | B1 * | 3/2001 | Tani | B62D 55/04 180/9.21 |
| 6,318,484 | B2 * | 11/2001 | Lykken | B62D 49/0678 180/9.1 |
| 6,874,586 | B2 * | 4/2005 | Boivin | B62D 55/04 180/9.26 |
| 8,636,326 | B2 * | 1/2014 | Inaoka | B62D 49/0635 305/125 |
| 8,801,115 | B2 * | 8/2014 | Hansen | B62D 55/04 305/142 |
| 2005/0035650 | A1 * | 2/2005 | Toews | B62D 49/0635 301/1 |
| 2007/0017714 | A1 | 1/2007 | Brazier | |
| 2007/0181351 | A1 | 8/2007 | Brazier | |
| 2008/0196948 | A1 * | 8/2008 | Despres | B62D 55/00 180/9.21 |
| 2009/0166101 | A1 * | 7/2009 | Wenger | B62D 5/063 180/6.7 |
| 2009/0321151 | A1 | 12/2009 | Archambault | |
| 2010/0012399 | A1 * | 1/2010 | Hansen | B62D 55/04 180/9.26 |
| 2010/0139994 | A1 | 6/2010 | Hansen | |
| 2010/0270041 | A1 * | 10/2010 | Groonwald | A62C 27/00 169/52 |
| 2011/0260527 | A1 | 10/2011 | Bessette | |
| 2012/0217071 | A1 * | 8/2012 | Fukumoto | B62D 49/0635 180/9.34 |
| 2014/0069730 | A1 * | 3/2014 | Lafreniere | B62D 55/084 180/9.21 |
| 2016/0221617 | A1 * | 8/2016 | Erickson | B62D 55/0655 |

FOREIGN PATENT DOCUMENTS

| | | | |
|---|---|---|---|
| EP | 2708453 A1 | 3/2014 | |
| FR | 2670738 A1 * | 6/1992 | ............ B62D 55/30 |
| WO | 2008/073456 A2 | 6/2008 | |
| WO | 2011/000093 A1 | 1/2011 | |
| WO | 2014/116227 A1 | 7/2014 | |

OTHER PUBLICATIONS

International Searching Authority, Patent Cooperation Treaty International Search Report, International Patent Application PCT/GB2016/050350, dated April 18, 2016.
International Searching Authority, Patent Cooperation Treaty Written Opinion of the International Searching Authority, International Patent Application PCT/GB2016/050350, dated Apr. 18, 2016.
European Patent Office, Communication Pursuant to Article 94(3) EPC (Examination Report), European Patent Application 16704922.0, dated Jun. 15, 2018.

* cited by examiner

APPARATUS ARRANGED FOR CONVERTING A WHEELED VEHICLE TO A TRACKED VEHICLE

PRIORITY

The present application is related to, claims the priority benefit of, and is a U.S. continuation-in-part patent application of, U.S. patent application Ser. No. 15/550,666, filed Aug. 11, 2017, which is related to, claims the priority benefit of, and is a U.S. national stage (§ 371) patent application of, PCT Patent Application Serial No. PCT/GB2016/050350, filed Feb. 12, 2016, which is related to, and claims the priority benefit of, Great Britain Patent Application Serial No. 1502475.5, filed Feb. 13, 2015. The contents of each of these applications are hereby incorporated by reference in their entirety into the present disclosure.

TECHNICAL FIELD

The present invention relates generally to apparatus arranged for converting a wheeled vehicle to a tracked vehicle, and finds particular, although not exclusive, utility in converting wheeled mini-loaders to run on continuous tracks.

BACKGROUND

Plant manufacturers typically produce mini-loaders with wheels and not tracks as they are not aimed at use on rough and/or soft terrain. By mini-loaders is meant less than 2 to 5 tonnes in weight un-laden. However, it is useful in some circumstances to use such plant in such conditions and in this case the use of continuous tracks is better than wheels. Relatively small (preferably less than 1 metre in length, although other lengths are contemplated) continuous track units may be retro-fitted to such vehicles via the drive hub. However, the vehicles in question have to be used carefully as the track units can shear-off the drive hub through rough use, shock loading and the like.

BRIEF SUMMARY

The present invention provides apparatus for retro-fitting these relatively small continuous track units to wheeled vehicles which may be used more roughly and which can withstand greater shock loading.

In a first aspect, the invention provides apparatus arranged for converting a wheeled vehicle to a tracked vehicle by attachment of a continuous track unit, the vehicle comprising a drive hub of the type which is arranged to have an attachable wheel, the continuous track unit replacing the wheel as the driving force of the vehicle, the apparatus comprising a first portion attachable to the vehicle's chassis, the first portion arranged to substantially surround the drive hub, a second portion including a support arm for supporting the continuous track unit, the second portion releasably attachable to the first portion, and a drive sprocket releasably attachable to the drive hub for transferring torque from the drive hub to the continuous track unit so as to rotate the track in use with the wheel removed and the apparatus attached to the vehicle, wherein the apparatus is arranged such that once attached to the vehicle the second portion and drive sprocket are removable, and a wheel is attachable to the drive hub with the first portion still attached to the support structure of the vehicle.

The vehicle's initially attached wheel typically includes a tyre, possibly pneumatic in nature. The wheel is suitable for running on the ground to propel the vehicle.

The chassis includes the vehicle's structural support framework which may include a substantially vertical surface to which the first portion is attachable; this substantially vertical surface remaining immobile relative to the remainder of the vehicle, excluding the drive hub and anything attached thereto. In other words, the chassis does not form part of the steering apparatus of the vehicle because the vehicle may have no steering apparatus (or steering knuckle), as such.

Continuous track units comprise of a support structure for supporting the idler wheels, and a drive sprocket for rotation of the track. The weight of the track unit, and the forces imparted on it in use, is borne by the support structure and not the drive sprocket.

Attachment of retro-fittable track units to steering knuckles of vehicles has been found to be damaging as the structure is not designed for the additional forces imparted to it by the track units. Accordingly, the apparatus for attaching the track unit's support structure is not attached to any part of the steering means of a vehicle.

The support arm of the second portion may support the support structure of the continuous track unit. The track unit may at least partially rotate, or pivot, about the support arm which is typically arranged substantially horizontally, in use. The second portion may be arranged to accept a support bracket of the continuous track unit. The second portion may include fasteners for releasably attaching the support arm thereto. The fasteners may comprise nuts and bolts. Alternatively, the support arm may be welded to the second portion.

The first portion may be attachable to the chassis by fasteners which extend parallel with the axis of rotation of the drive hub. For instance, bolts may be used passing through holes provided through the side wall of the first portion and through corresponding holes provided in the chassis with nuts located behind the chassis.

The second portion may comprise an annual plate which is releasably attachable to the first portion via fasteners, such as bolts. The bolts may pass through holes arranged in the second portion and into corresponding holes arranged in the outer face of the first portion. In this regard, the outer face is taken to mean the face at the axial end of the first portion opposite from the end attached to the chassis.

The fasteners may be arranged circumferentially around the drive hub. The fasteners may be arranged approximately equidistantly around the drive hub.

This may help to spread any imparted forces avoiding undue stress in any particular area.

The drive sprocket may be releasably attachable to the drive hub directly or indirectly. In other words an intermediary member may be provided between the drive hub and the drive sprocket. The intermediary member may be welded or removably attachable to the drive sprocket.

The wheel may be re-attachable to the drive hub with the first portion still attached to the support structure of the vehicle because the first portion is arranged not to extend beyond the outer face of the drive hub such that it will not foul the wheel.

The first portion may comprise a substantially cylindrical member. The diameter of the bore of the cylinder may be only slightly larger than the diameter of the drive hub. For instance, it might be in the range of 5 to 50 mm greater in radius. Preferably it might be only 5 to 20 mm greater in radius such that the gap between the outer circumference of the drive hub, at its widest point within the bore of the first portion, and the inner surface of the first portion is quite narrow.

The term "drive hub" includes drive motor.

The first portion may have a wall thickness which varies along its axial length such that it is thicker at the axial end opposite from the end attachable to the vehicle chassis. The thickness may change gradually or be stepped. The first portion may be formed from a cylinder of mild steel or aluminium having an initial wall thickness of approximately 20 mm. Portions of the wall may be reduced in thickness towards the end which attaches to the support structure of the vehicle so as to reduce weight. Portions of the wall may be increased in thickness towards the end opposite from the end which attaches to the support structure so as to increase its strength. The wall may have a step change in thickness, or a tapering so as to fit around the drive hub of the vehicle without contacting it.

In a second aspect, the invention provides a vehicle comprising apparatus according to the first aspect.

The vehicle may be articulated.

In a third aspect, the invention provides an articulated wheeled vehicle including apparatus arranged for converting it to an at least partially tracked vehicle by attachment of a continuous track unit, the vehicle comprising a drive hub of the type which is arranged to have an attachable wheel, the continuous track unit replacing the wheel as the driving force of the vehicle, the apparatus comprising a first portion attached to the vehicle's chassis, the first portion arranged to substantially surround the drive hub, a second portion including a support arm for supporting the continuous track unit, the second portion releasably attached to the first portion, and a drive sprocket releasably attached to the drive hub for transferring torque from the drive hub to the continuous track unit so as to rotate the track in use.

The vehicles may have rigid drive axles such that steering of the vehicle is effected by slewing the two halves of the vehicle, separated by the articulation joint, relative to one another.

The vehicles may be arranged to lift and carry loads. The vehicles may be a loader, a fork lift, a tele-handler, or a tool-carrier. The vehicle may comprise a movable arm. The arm may be telescopic. The vehicle may have a weight less than 2 tonnes.

It is possible to convert a wheeled vehicle to a tracked vehicle with alternative apparatus such that in a fourth aspect, the invention provides apparatus arranged for converting a wheeled vehicle to a tracked vehicle by attachment of a continuous track unit, the vehicle comprising a drive hub of the type which is arranged to have an attachable wheel, the continuous track unit replacing the wheel to engage ground in use for movement of the vehicle, the apparatus comprising a mounting portion releasably attachable to the vehicle's chassis, the mounting portion arranged to substantially surround the drive hub, a support arm for supporting the continuous track unit, and a drive sprocket releasably attachable to the drive hub for transferring torque from the drive hub to the continuous track unit so as to rotate the track in use with the wheel removed and the apparatus attached to the vehicle.

The chassis includes the vehicle's structural support framework which may include a substantially vertical surface to which the mounting portion is attachable; this substantially vertical surface remaining immobile relative to the remainder of the vehicle, excluding the drive hub and anything attached thereto. In other words, the chassis does not form part of the steering apparatus of the vehicle because the vehicle may have no steering apparatus (or steering knuckle), as such.

Continuous track units comprise of a support structure for supporting the idler wheels, and a drive sprocket for rotation of the track. The weight of the track unit, and the forces imparted on it in use, is borne by the support structure and not the drive sprocket. The support structure may include an idler carriage comprising two parallel plates held together by tie bars and to which idler wheels are pivotably mounted.

The mounting portion may comprise a flat plate for abutting against the vehicle's chassis when attached thereto.

The mounting portion may comprise through-holes for bolting it to the vehicle's chassis.

The mounting portion may be attachable to the vehicle's chassis by fasteners which extend parallel with the axis of rotation of the drive hub. For instance, bolts may be used passing through holes provided through the side wall of the mounting portion and through corresponding holes provided in the chassis with nuts located behind the chassis.

The mounting portion may be attachable to the chassis by fasteners arranged circumferentially around the drive hub.

The fasteners may be arranged approximately equidistantly around the drive hub. This may help to spread any imparted forces avoiding undue stress in any particular area.

The mounting portion may be in the form of a plate with a hole in it through which the drive hub projects when fitted to a vehicle chassis. In other words, the mounting portion may be an annulus. Alternatively, the mounting portion may be in the form of a plate which has an aperture in it extending to one edge of the plate, the drive hub projecting through the aperture with the mounting portion fitted to a vehicle chassis.

The support arm may be arranged to fit into an idler carriage of a track unit comprising tie-bars, wherein the support arm is arranged to replace an existing tie-bar.

The support arm may be integral with the mounting portion, or releasably attachable thereto. The apparatus may include gussets welded between the support arm and the mounting portion wherein at least two gussets are oriented orthogonally to one another.

The support arm may support the support structure of the continuous track unit. The track unit may at least partially rotate, or pivot, about the support arm which is typically arranged substantially horizontally, in use. The support arm may be arranged to accept a support bracket of the continuous track unit.

The drive sprocket may be releasably attachable to the drive hub directly or indirectly. In other words, an intermediary member may be provided between the drive hub and the drive sprocket. The intermediary member may be welded or removably attachable to the drive sprocket.

The term "drive hub" may include drive motor.

The support arm may be arranged such that it is off-set to one side of a centre-line passing vertically through the drive hub. For instance, the support arm may be arranged such that it is off-set towards the front of the vehicle in front of a centre-line passing vertically through the drive hub. In this way the stability of the vehicle may be enhanced because the distance between the front and rear tracks may be increased. Likewise, the support arm on apparatus attached to a rear of the vehicle may be arranged such that it is off-set towards the rear of the vehicle behind a centre-line passing vertically through the drive hub.

The support arm may be arranged below the drive hub. This may reduce any increase in height of the vehicle being caused through replacement of a wheel having a radius less than the distance between the centre of the drive hub and the bottom of the tracks immediately below.

In a fifth aspect, the invention provides an articulated wheeled vehicle including apparatus arranged for converting it to an at least partially tracked vehicle by attachment of a continuous track unit, the vehicle comprising a drive hub of the type which is arranged to have an attachable wheel, the continuous track unit replacing the wheel to engage ground in use for movement of the vehicle, the apparatus comprising a mounting portion releasably attachable to the vehicle's chassis, the mounting portion arranged to substantially surround the drive hub, a support arm for supporting the continuous track unit, and a drive sprocket releasably attachable to the drive hub for transferring torque from the drive hub to the continuous track unit so as to rotate the track in use with the wheel removed and the apparatus attached to the vehicle.

The vehicle may comprise two units articulated together with an articulated joint, and comprising rigid drive axles such that steering of the vehicle is effected by slewing the two units of the vehicle, separated by the articulation joint, relative to one another.

The vehicles may be arranged to lift and carry loads. The vehicles may be a loader, a fork lift, a tele-handler, or a tool-carrier. The vehicle may comprise a movable arm. The arm may be telescopic. The vehicle may have a weight less than 5 tonnes.

BRIEF DESCRIPTION OF THE DRAWINGS

The above and other characteristics, features and advantages of the present invention will become apparent from the following detailed description, taken in conjunction with the accompanying drawings, which illustrate, by way of example, the principles of the invention. This description is given for the sake of example only, without limiting the scope of the invention. The reference figures quoted below refer to the attached drawings.

DETAILED DESCRIPTION

Figure 1:
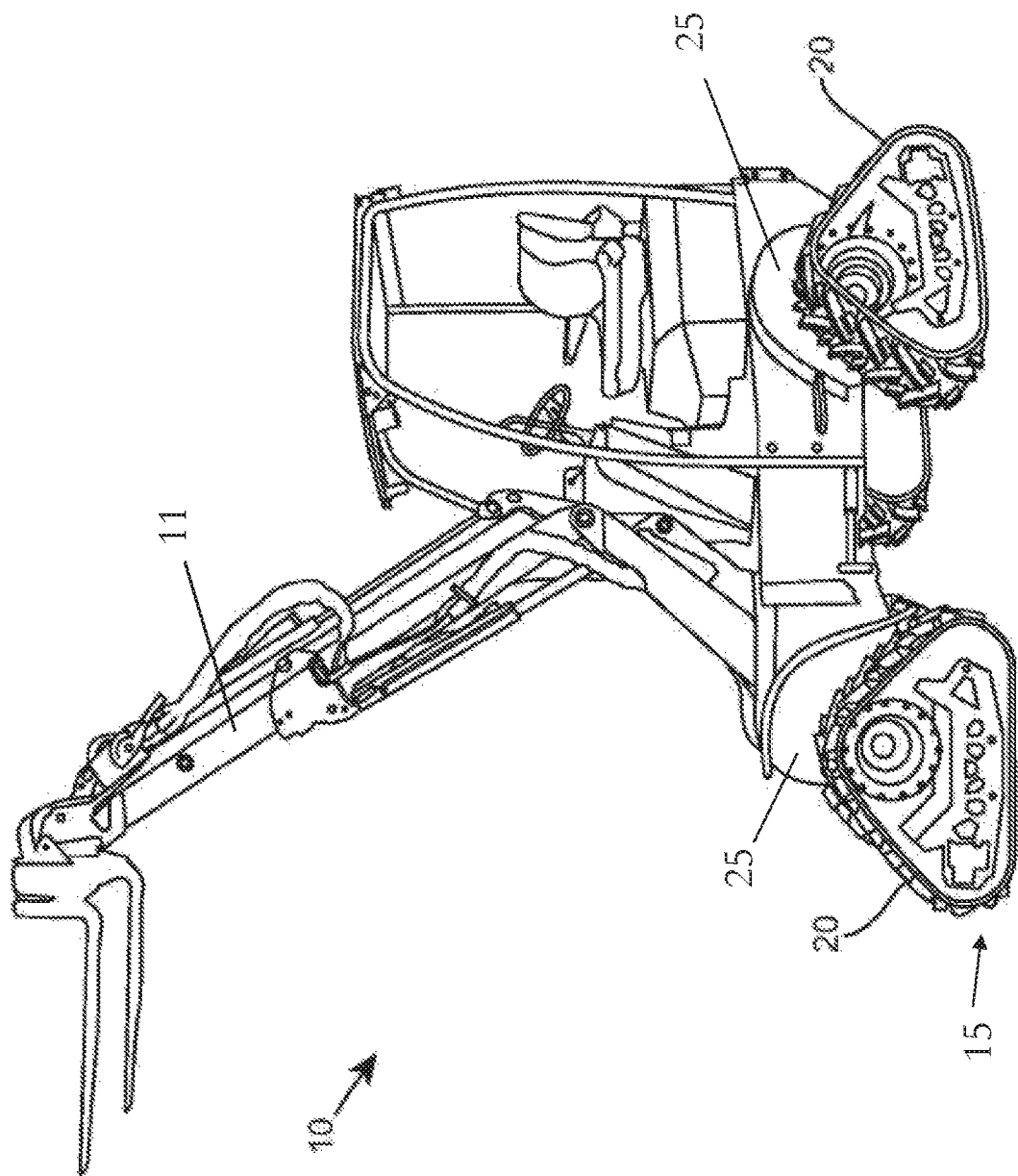
FIG. 1 is a perspective view of a vehicle converted to include continuous track units in place of wheels.

The present invention will be described with respect to certain drawings but the invention is not limited thereto but only by the claims. The drawings described are only schematic and are non-limiting. Each drawing may not include all of the features of the invention and therefore should not necessarily be considered to be an embodiment of the invention. In the drawings, the size of some of the elements may be exaggerated and not drawn to scale for illustrative purposes. The dimensions and the relative dimensions do not correspond to actual reductions to practice of the invention.

Furthermore, the terms first, second, third and the like in the description and in the claims, are used for distinguishing between similar elements and not necessarily for describing a sequence, either temporally, spatially, in ranking or in any other manner. It is to be understood that the terms so used are interchangeable under appropriate circumstances and that operation is capable in other sequences than described or illustrated herein.

Moreover, the terms top, bottom, over, under and the like in the description and the claims are used for descriptive purposes and not necessarily for describing relative positions. It is to be understood that the terms so used are interchangeable under appropriate circumstances and that operation is capable in other orientations than described or illustrated herein.

It is to be noticed that the term "comprising", used in the claims, should not be interpreted as being restricted to the means listed thereafter; it does not exclude other elements or steps. It is thus to be interpreted as specifying the presence of the stated features, integers, steps or components as referred to, but does not preclude the presence or addition of one or more other features, integers, steps or components, or groups thereof. Thus, the scope of the expression "a device comprising means A and B" should not be limited to devices consisting only of components A and B. It means that with respect to the present invention, the only relevant components of the device are A and B.

Reference throughout this specification to "an embodiment" or "an aspect" means that a particular feature, structure or characteristic described in connection with the embodiment or aspect is included in at least one embodiment or aspect of the present invention. Thus, appearances of the phrases "in one embodiment", "in an embodiment", or "in an aspect" in various places throughout this specification are not necessarily all referring to the same embodiment or aspect, but may refer to different embodiments or aspects. Furthermore, the particular features, structures or characteristics of any embodiment or aspect of the invention may be combined in any suitable manner, as would be apparent to one of ordinary skill in the art from this disclosure, in one or more embodiments or aspects.

Similarly, it should be appreciated that in the description various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Moreover, the description of any individual drawing or aspect should not necessarily be considered to be an embodiment of the invention. Rather, as the following claims reflect, inventive aspects lie in fewer than all features of a single foregoing disclosed embodiment. Thus, the claims following the detailed description are hereby expressly incorporated into this detailed description, with each claim standing on its own as a separate embodiment of this invention.

Furthermore, while some embodiments described herein include some features included in other embodiments, combinations of features of different embodiments are meant to be within the scope of the invention, and form yet further embodiments, as will be understood by those skilled in the art. For example, in the following claims, any of the claimed embodiments can be used in any combination.

In the description provided herein, numerous specific details are set forth. However, it is understood that embodiments of the invention may be practised without these specific details. In other instances, well-known methods, structures and techniques have not been shown in detail in order not to obscure an understanding of this description.

In the discussion of the invention, unless stated to the contrary, the disclosure of alternative values for the upper or lower limit of the permitted range of a parameter, coupled with an indication that one of said values is more highly preferred than the other, is to be construed as an implied statement that each intermediate value of said parameter, lying between the more preferred and the less preferred of said alternatives, is itself preferred to said less preferred value and also to each value lying between said less preferred value and said intermediate value.

The use of the term "at least one" may mean only one in certain circumstances.

The principles of the invention will now be described by a detailed description of at least one drawing relating to exemplary features of the invention. It is clear that other arrangements can be configured according to the knowledge of persons skilled in the art without departing from the underlying concept or technical teaching of the invention, the invention being limited only by the terms of the appended claims.

FIG. 1 is a view of an articulated vehicle 10 converted to include continuous track units 15, comprising tracks 20, attached to the vehicle's chassis 25 in place of each of its four wheels. The vehicle includes a telescopic movable arm 11.

Figure 2:
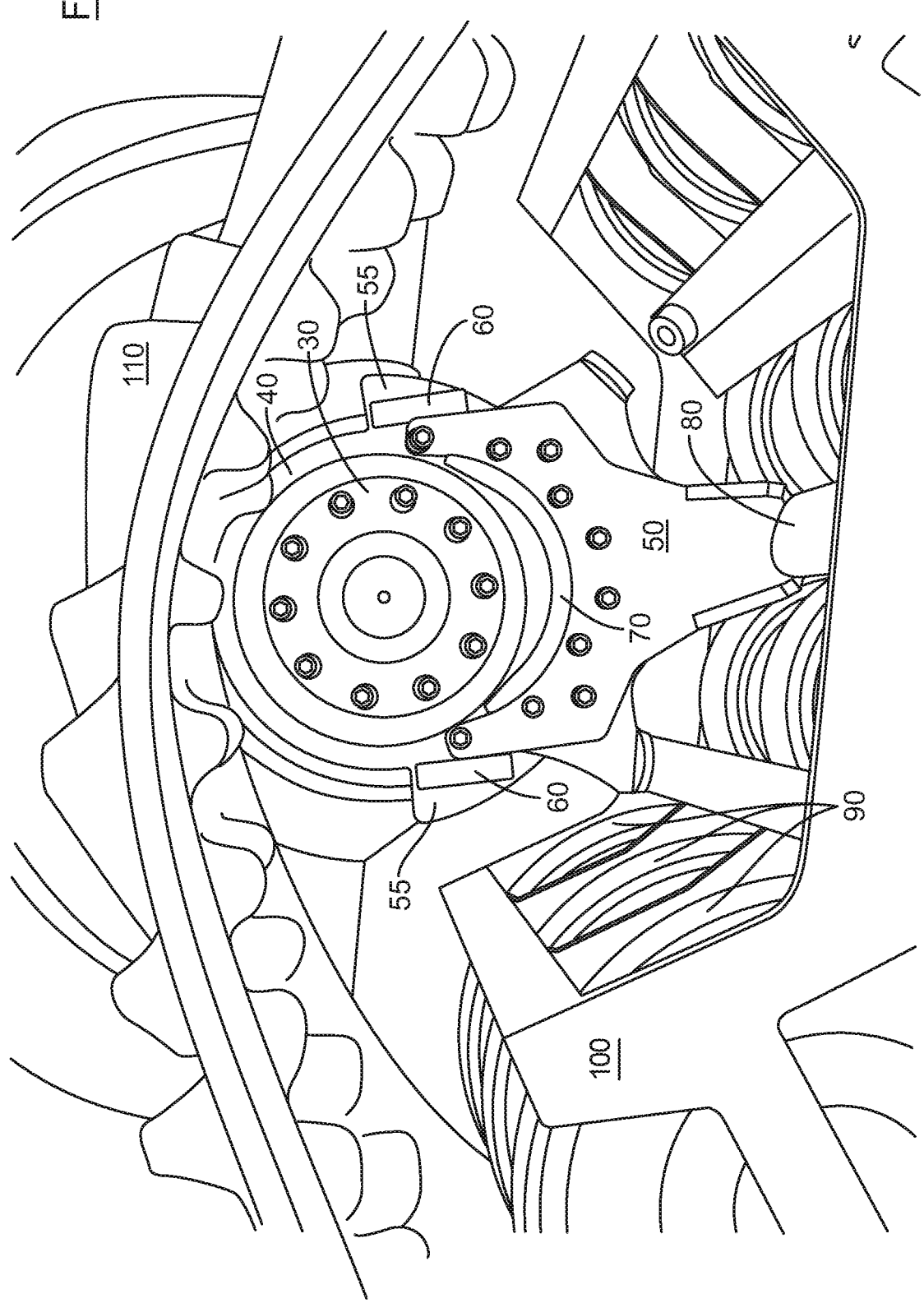
FIG. 2 is a partial view of a vehicle including at least some of the conversion apparatus and the continuous track unit.

In FIG. 2 the drive hub 25 of the vehicle is shown. The drive hub 25 includes a disc 30 which includes bolts for attaching to a wheel rim in the vehicle's un-converted state. In use, the disc 30 rotates thus rotating the wheel rim.

A first portion 40 of the apparatus has been attached to the support structure of the vehicle. The first portion is in the form of a cylinder and it surrounds the drive hub 25. The first portion remains stationary and the disc 30 of the drive hub 25 may rotate relative to it.

A second portion 55 of the apparatus in the form of a flange attached to the lower half of the axial end (furthest from the support structure) is partially visible. It is attached to the end of the first portion by welding but it may be affixed by nuts and bolts.

A support bracket 50 is attached to this second portion by means of nuts and bolts. The support bracket 50 includes a rocker bar 80 about which the continuous track unit is partially supported and about which it may at least partially rotate. Some of the idler wheels 90 are visible within their own support structure 100 which is pivotably connected to the rocker bar 80. A portion of the track 110 is visible; however, the sprocket is not shown for the sake of clarity.

The second portion 55 includes metal protrusions 60, 70 welded to its front (outer) face which lie against the sides of the support bracket 50. The rotational movement of the support bracket 50 about an axis parallel to the rotational axis of the drive hub/disc 25, 30 is thus impeded by these projections 60,70 in addition to that provided by the nuts and bolts.

The recess may be 4 to 6 mm in depth, although other depths are contemplated. The recess may more firmly locate the bracket with the second portion and prevent the bracket moving relative to the second portion such that the attachment bolts do not shear. In this way, shock loading of the vehicle may occur with higher, than otherwise, loads without the bolts shearing and the continuous track units coming off the vehicle.

The recess may alternatively be formed within the surface of the second portion.

Figure 3:
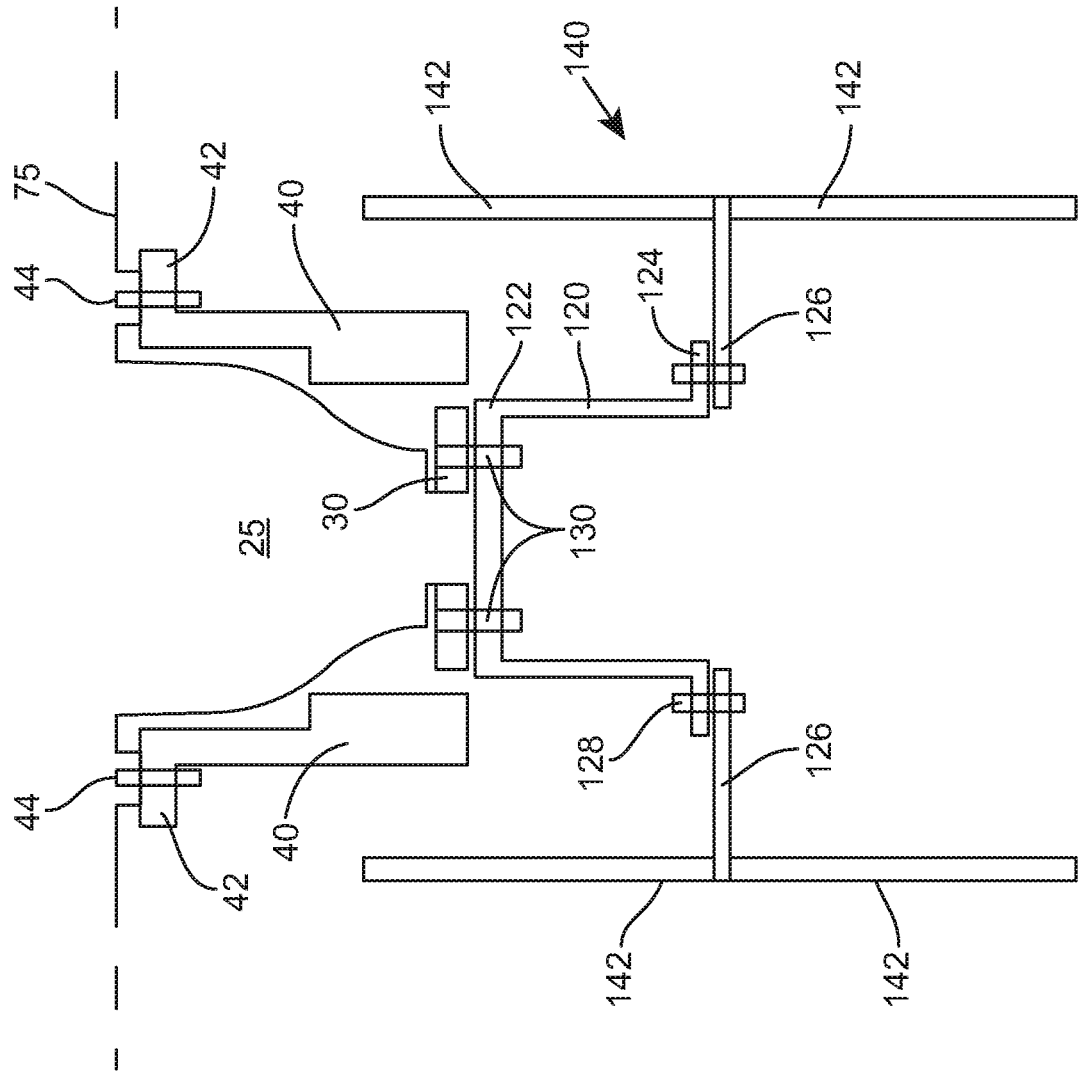
FIG. 3 is a schematic plan view of at least some of the conversion apparatus attached to a drive hub with a sprocket attached.

FIG. 3 is a schematic of the situation where the wheel has been removed from the vehicle and been replaced by the first portion 40 attached to the body of the vehicle 75 by means of bolts 44 located through a radially outwardly extending flange 42 at one end of the first portion. The first portion 40 is substantially cylindrical, other than for the flange, but has thickened walls at the axial end away from the vehicle body 75. The first portion 40 extends axially as far as the disc 30.

The second portion 55 is shown for the sake of clarity.

The third portion 120 is shown attached to the disc 30 by means of bolts 130. The third portion is also substantially cylindrical including an open end axially distant from the vehicle body 75. The opposite axial end, closest to the disc 30, may also be open to reduce weight but has a radially inwardly extending flange 122 through which the bolts 130 may pass. At the open end, axially distant from the vehicle body 75, a radially outwardly extending flange 124 is provided to which an annular disc 126 of the sprocket 140 is bolted 128.

The second portion 55 alternatively may be in the form of an annular disc with the third portion 120 being attached to the drive hub/disc through its open centre.

The apparatus may be arranged such that the third portion, or the second and third portions, are removable from the vehicle so that the wheel is re-attachable to the drive hub with the first and second portions, or the first portion, still attached to the vehicle. In this way, wheels may be re-fitted to the vehicle and then removed again and swapped for track units without the need to remove all of the apparatus from the vehicle.

The sprocket 140 is a standard, well known sprocket which includes bars 142 (sprocket drive bars) which contact the inside of the continuous track (not shown) for driving it.

Figure 4:
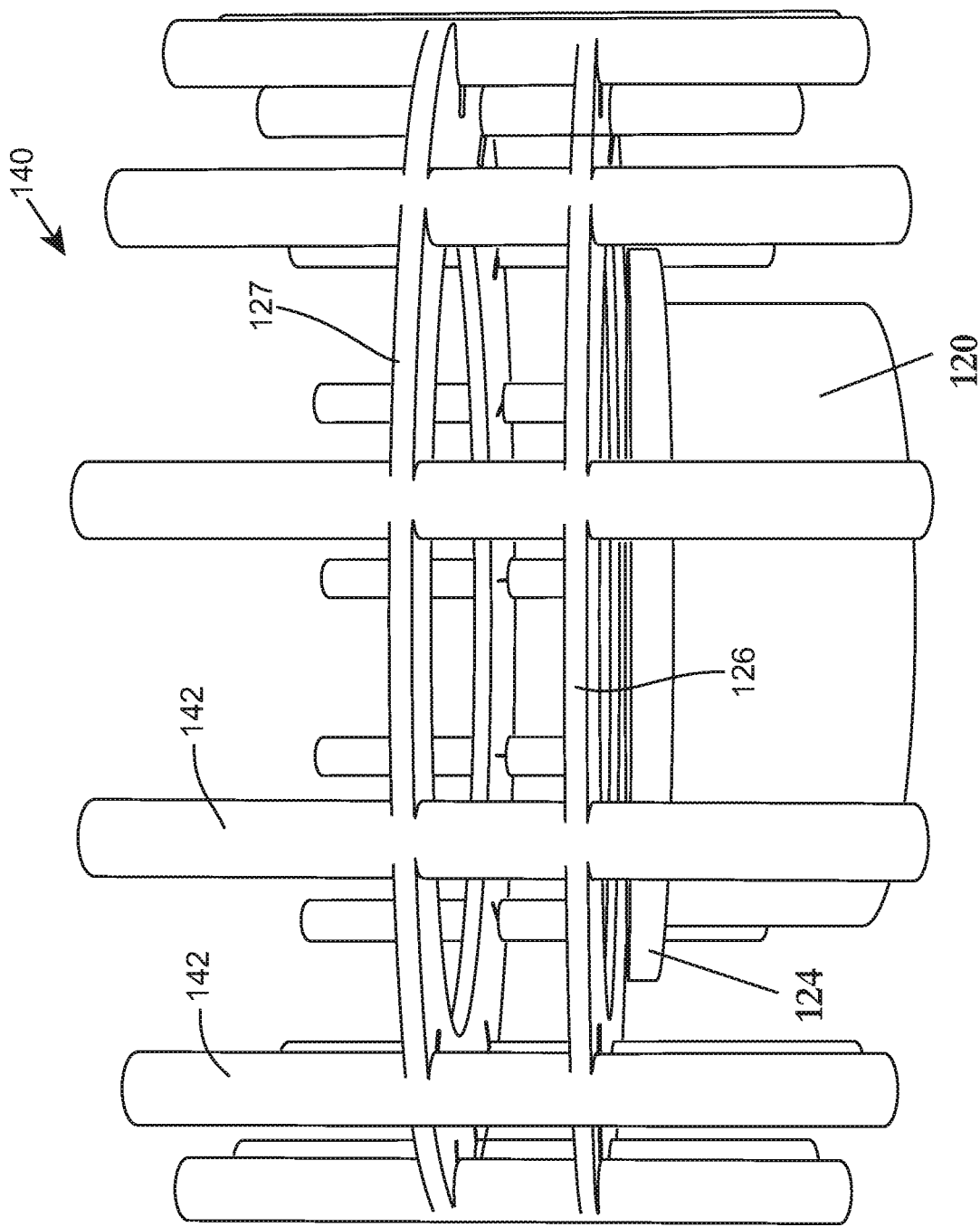
FIG. 4 is a view of a continuous track unit sprocket.

A standard sprocket 140 is shown in FIG. 4. An array of driver bars 142 can be seen to extend around the circumference of the sprocket 140. The bars 142 are attached together by two annular discs 126, 127 spaced axially apart.

In use, the drive hub/disc 25, 30 will rotate, thus rotating the third portion and the sprocket.

Figure 5:
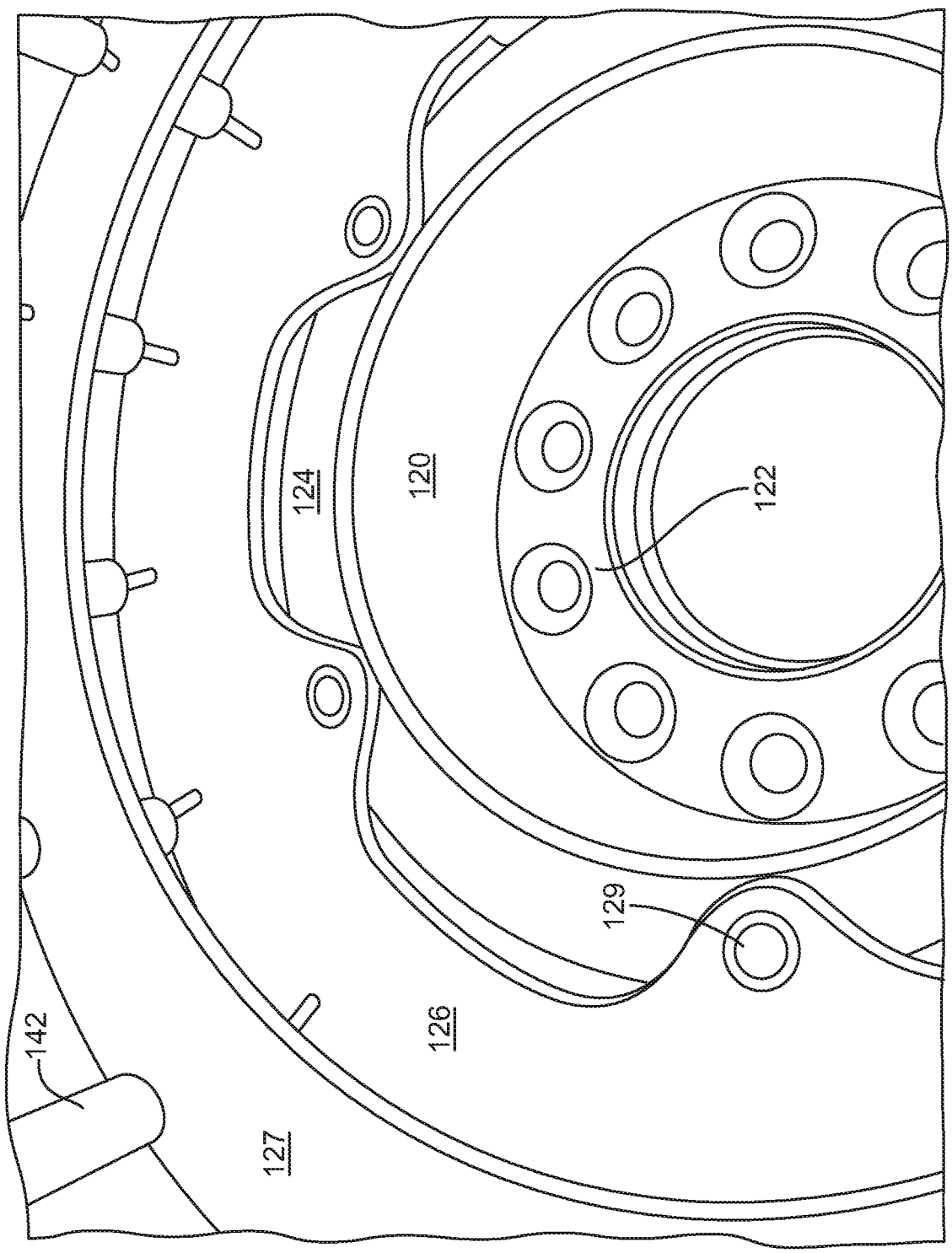
FIG. 5 is a partial view of a sprocket and part of the conversion apparatus.

FIG. 5 shows a portion of the third portion 120 whereby the axially distant outer flange 124 to which the sprocket 140 is attached may be seen. The annular disc 126 forming part of the sprocket 140 includes holes 129 through which bolts 128 pass to attach it to the flange 124.

The other annular disc 127 is also visible axially spaced above the annular disc 124. Some of the bars 142 are also visible extending out of the annular disc 127 perpendicularly.

Figure 6:
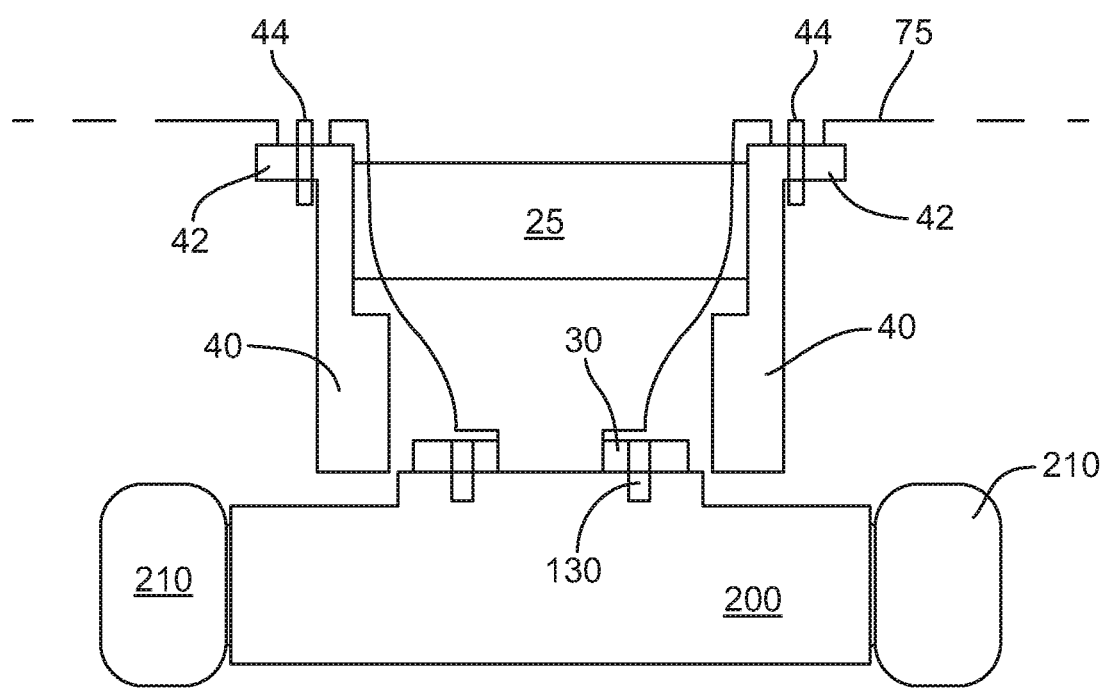
FIG. 6 is a schematic plan view of at least some of the conversion apparatus attached to a drive hub with a wheel attached.

With the first portion 40 attached to the vehicle body 75 the third portion 120 may be removed and the wheel 200 re-attached by bolts 130 to the disc 30. This is shown in FIG. 6. The second portion may be present but if it is it will not hinder the attachment or rotation of the wheel 200 as it does not extend far enough axially away from the end of the first portion 40 to interfere with the wheel 200. The wheel is shown with a tyre 210 fitted.

Figure 7:
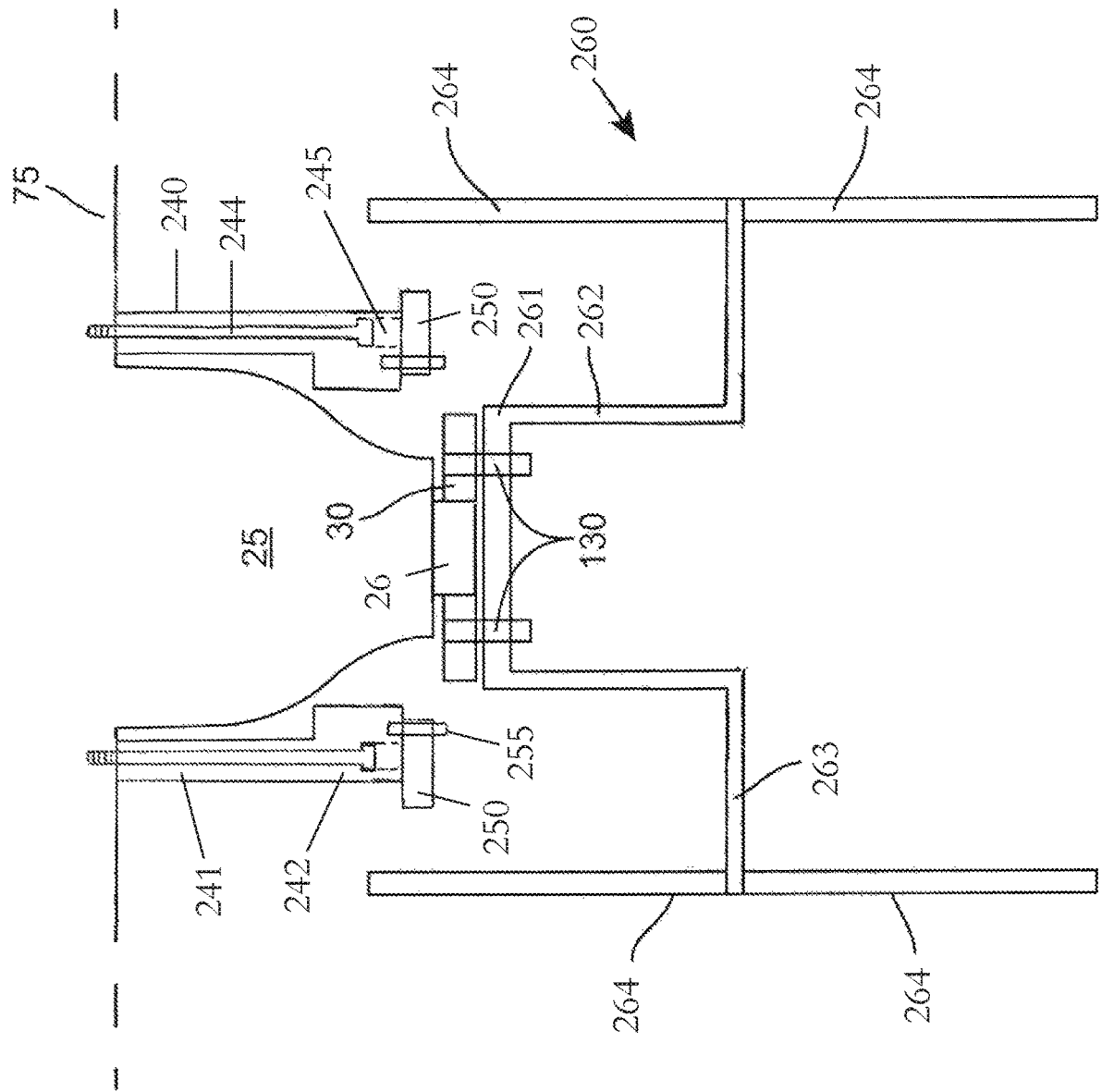
FIG. 7 is a schematic plan view of at least some of an alternative conversion apparatus attached to a drive hub with a sprocket attached.

In FIG. 7 an alternative arrangement is indicated. In this arrangement the first portion 240 is substantially the same as the first portion 40 described above in that it includes a cylinder having an outer uniformly smooth wall and an internal bore which is stepped such that there is a thinner walled section 241 adjacent the chassis 75 of the vehicle and a thicker walled section 242 distal from the thinner walled section 241.

Bolts 244 are arranged via openings provided axially through the wall of the first portion 240. The bolts 244 extend through the chassis 75 behind which nuts may be placed. Alternatively there may be tapped holes provided in the chassis 75 into which the bolts may tighten.

The openings in the wall of the first portion 240 for the bolts 244 have a widened end distal from the chassis for the head of the bolt to rest in. This widened portion 245 extends to the outer face of the first portion 240 so that the bolts 244 may be inserted into the holes and for access to the head for tightening. The bolts 244 have their long axes parallel with the axis of rotation of the drive hub 25.

The second portion 250 in this alternative arrangement comprises a plate having a hole therein (in other words an annulus) which is arranged against the outer face of the first portion 240 such that the hole matches with the bore of the first portion.

The second portion is affixed to the first portion using bolts 255 which pass through the second plate and into threaded/tapped holes provided in the outer face of the first portion. The bolts 255 have their long axes parallel with the axis of rotation of the drive hub 25. The holes for receiving bolts 255 to attach the second portion 250 to the first portion 240 are arranged approximately equidistantly and around the hole/bore. This ensures an even spread of any loading.

The drive hub 25 includes a rotatable part 26 including a disc 30 to which the drive sprocket 260 is attachable. In the present example, the drive sprocket 260 includes a cylindrical central portion 262 having a bore with a long rotation axis parallel to the axis of rotation of the disc 30. The central portion 262 has a flange 263 extending radially outwardly at an end distal from the disc 30. At the end of the flange 263 sprocket drive bars 264 are arranged having their long axes parallel with the axis of rotation of the disc 30. These bars 264 contact the inside of the continuous track (not shown) for driving it.

At the other axial end of the cylindrical portion 262 a flange 261 extends radially inward providing a surface which can be attached to the outer face of the disc 30 via bolts 130.

The drive sprocket 260 is similar to the one described in relation to FIG. 4. In this respect the feature referenced 120 is equivalent to the cylindrical portion 262, the feature referenced 126 is equivalent to the flange 263, and the bars referenced 142 are equivalent to the bars 264.

Not shown in FIG. 7 is the support arm 280 attached to this second portion 250. However, with reference to FIG. 8 its position may be observed to be below the disc 30 extending away from a lower portion 252 of the second portion 250, below the hole through which the disc 30 projects, in a direction substantially parallel with the rotational axis of the disc 30. The support arm 280 (or rocker arm) takes the form of a cylinder. Gussets 253 are provided between the arm 280 and the second portion's outer face to strengthen it.

Figure 8:
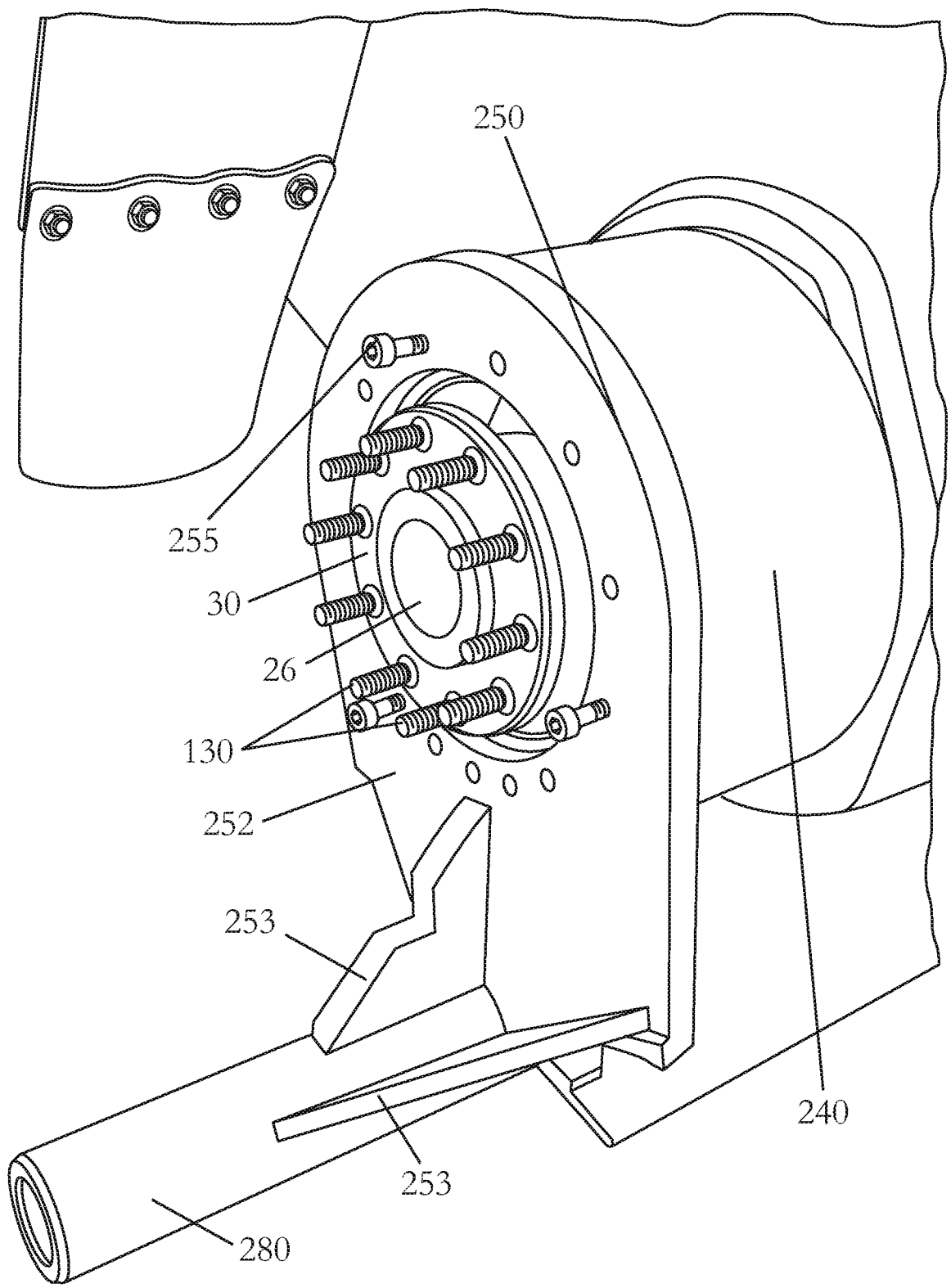
FIG. 8 is an elevational view of the alternative conversion apparatus of FIG. 7.

Also shown in FIG. 8 is the disc 30 and central rotatable part 26, the bolts 130 for attachment of the drive sprocket (not shown) arranged equidistantly around the disc 30, and the bolts 255 and holes for accepting further bolts 255 for attaching the second portion 250 to the first portion 240.

The continuous track unit (not shown) is supported by the arm 280 and it may at least partially rotate about it. The track unit may take the same form as the one partially shown in FIG. 2.

The apparatus shown in FIG. 8 can be seen to be compact, lightweight and relatively simple to attach to, and remove from, a vehicle.

Figure 9:
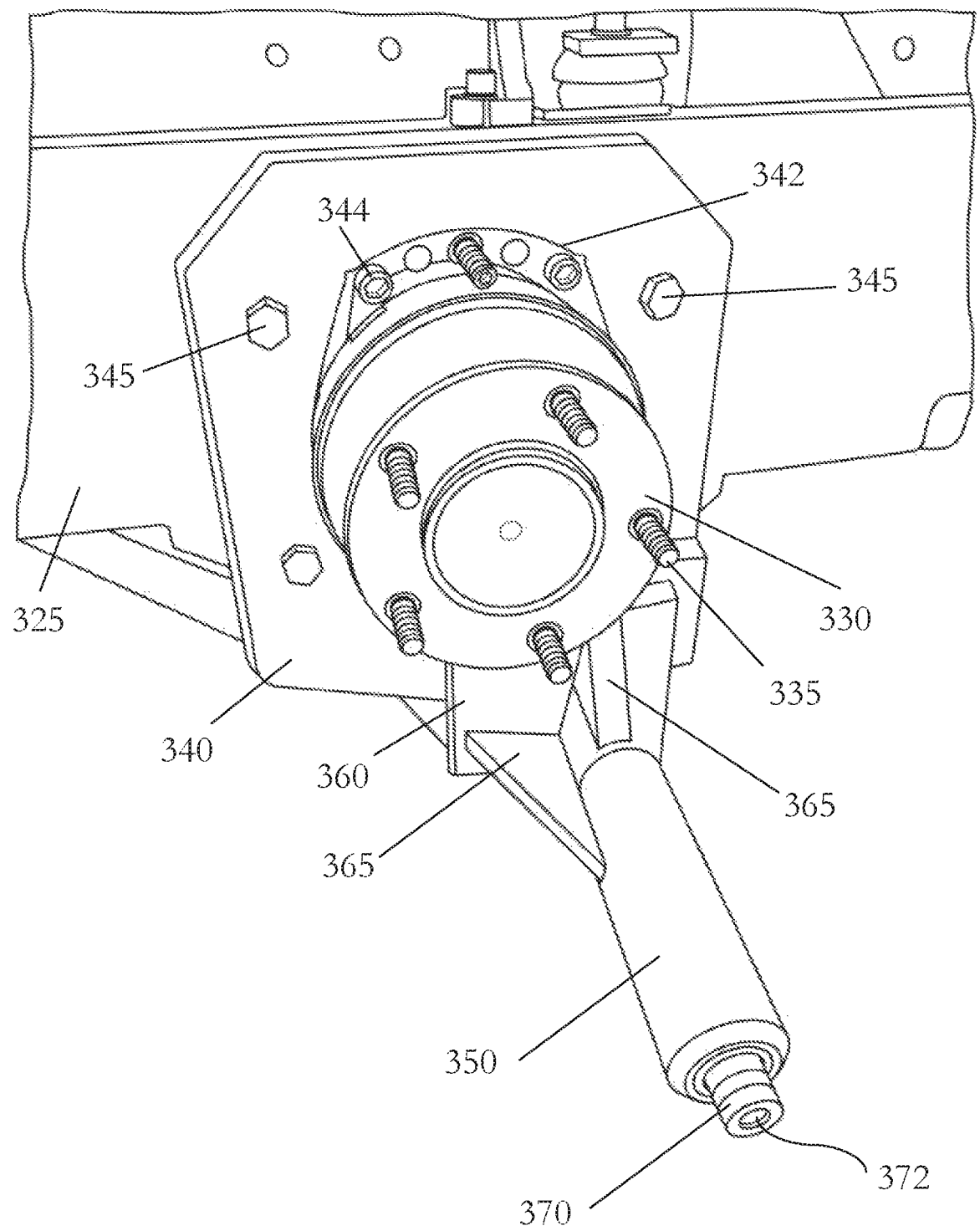
FIG. 9 is a perspective view of part of a vehicle including at least some of a different conversion apparatus.

In FIG. 9 part of a vehicle's chassis 325 is shown. A drive hub 330 is shown projecting from the chassis 325. Around the drive hub 330 a mounting portion in the form of a plate 340 has been bolted via bolts 345 to the chassis 325. The plate has been cut to so that there is no portion 342 above the drive hub 330 so as not to foul bolts 344 required for other purposes by the vehicle.

The plate completely surrounds the drive hub 330 such that the hole does not reach the sides or edges of the plate 340.

A support arm 350 is shown extending away from the plate 340 in a substantially orthogonal direction. The support arm 350 comprises a cylindrical section having a uniform diameter which accounts for the majority of its length. Within the support arm 350 a pin 370 is arranged. The pin 370 is rotatable within, and relative to, the arm 350 by means of bushings (not shown) arranged between them and internally of the arm 350. This pin 370 extends outwardly from the end of the arm 350 distal from the chassis 325 and plate 340. At its most distal end, a threaded socket 372 is provided in the pin 370 for receipt of a bolt as will be explained in more detail below.

The support arm 350 is attached to a plate 360 which is itself welded to the mounting portion 340. Gussets 365 in the form of triangular plates are welded between the support arm 350 and the mounting portion 340 to provide strength. One is shown lying in a vertical plane and one in a horizontal plane.

The drive hub 330 includes bolts 335 projecting axially therefore for attachment of a drive sprocket.

Figure 10:
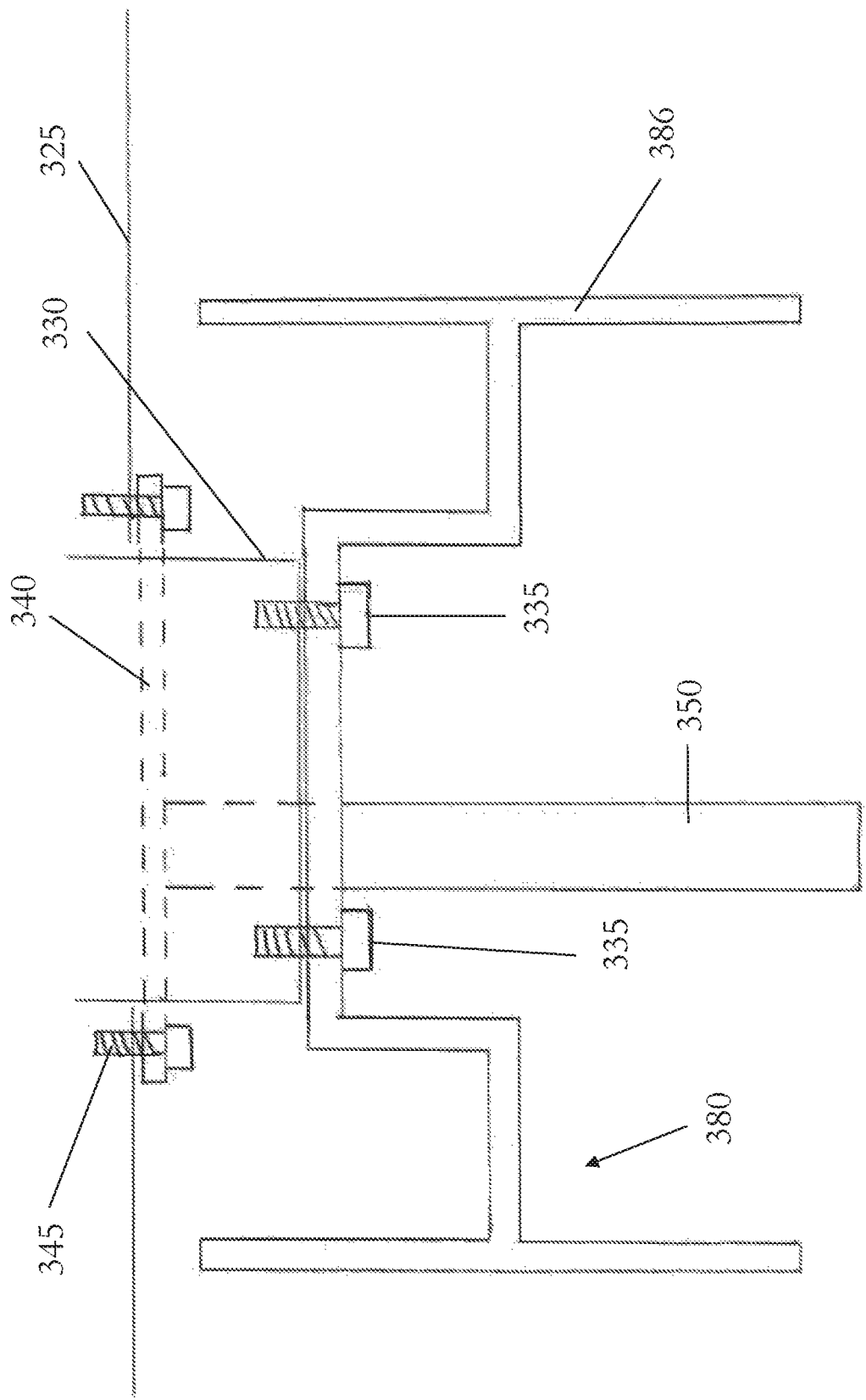
FIG. 10 is a schematic plan view of at least some of the different conversion apparatus attached to a chassis of a vehicle.

FIG. 10 is a schematic of the situation where a wheel has been removed from a vehicle and has been replaced by the mounting portion 340 (partially shown in broken lines around the wheel hub 330) attached to the chassis 325 of the vehicle by means of bolts 345 located through the plate.

The support arm 350 is shown extending from the mounting portion 340.

A sprocket 380 is a standard, well known sprocket which includes bars 386 (sprocket drive bars) which contact the inside of the continuous track (not shown) for driving it.

In use, the drive hub 330 will rotate, thus rotating the sprocket.

Figure 11:
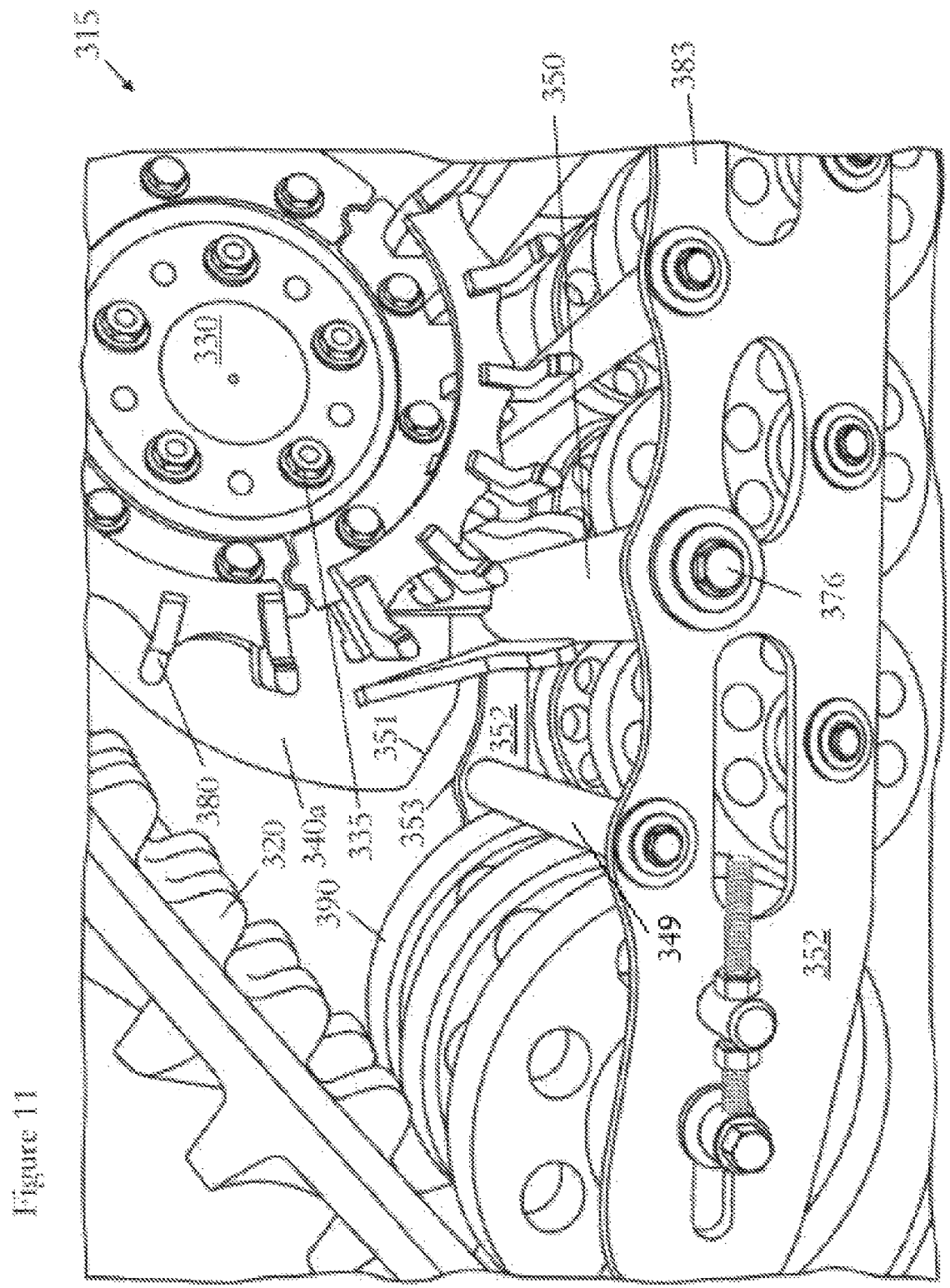
FIG. 11 is a perspective view of part of a vehicle including the different conversion apparatus.

In FIG. 11 a portion of a differently shaped mounting portion 340a is shown. This mounting portion is in the form a plate 340a and is attached to the chassis (not shown) of the vehicle in a similar manner to that described above. Also shown in FIG. 11 is a portion of continuous track unit 315 attached to the vehicle via a support arm 350. It is seen that the pin 370 of the support arm 350 extends through the idler carriage 383 and includes a bolt 376 at its distal end screwed into the threaded socket 372 to thereby retain the arm with the carriage. FIG. 11 also shows the support arm 350 being arranged to fit into an idler carriage 383 of a track unit comprising tie-bars 349, wherein the support arm 350 is arranged to replace an existing tie-bar 349.

The carriage 383 comprises two parallel plates 352 between which idlers 390 are rotatably supported. A portion of track 320 is also shown for clarity. The sprocket 380 is visibly bolted 335 to the drive hub 330.

In use, rotation of the carriage 383, and thus the track unit 315, about the support arm 350 is limited by an abutting portion 351 of the mounting portion 340a abutting against an abutting portion 353 of the carriage plate 352 closest to the chassis. Although not visible, similar abutting sides are arranged on the carriage 383 on the other side of the arm 350 and drive hub 330 from those shown.

The mounting portion 340a and support arm 350 can be seen to be compact, lightweight and relatively simple to attach to, and remove from, a vehicle.

While various embodiments of devices, systems, and methods have been described in considerable detail herein, the embodiments are merely offered as non-limiting examples of the disclosure described herein. It will therefore be understood that various changes and modifications may be made, and equivalents may be substituted for elements thereof, without departing from the scope of the present disclosure. The present disclosure is not intended to be exhaustive or limiting with respect to the content thereof.

Further, in describing representative embodiments, the present disclosure may have presented a method and/or a process as a particular sequence of steps. However, to the extent that the method or process does not rely on the particular order of steps set forth therein, the method or process should not be limited to the particular sequence of steps described, as other sequences of steps may be possible. Therefore, the particular order of the steps disclosed herein should not be construed as limitations of the present disclosure. In addition, disclosure directed to a method and/or process should not be limited to the performance of their steps in the order written. Such sequences may be varied and still remain within the scope of the present disclosure.

The invention claimed is:

1. Apparatus arranged for converting a wheeled vehicle to a tracked vehicle by attachment of a continuous track unit, the vehicle comprising a drive hub which is arranged to have an attachable wheel, the continuous track unit replacing the wheel to engage ground in use for movement of the vehicle, the apparatus comprising a mounting portion releasably attachable to a chassis of the vehicle, the mounting portion arranged to substantially surround the drive hub, a support arm for supporting the continuous track unit, and a drive sprocket releasably attachable to the drive hub for transferring torque from the drive hub to the continuous track unit so as to rotate a track in use with the wheel removed and the apparatus attached to the vehicle, wherein the support arm is arranged to fit into an idler carriage of the continuous track unit comprising tie-bars and to replace an existing tie-bar.

2. The apparatus according to claim 1, wherein the mounting portion comprises a flat plate for abutting against the vehicle's chassis when attached to the vehicle's chassis.

3. The apparatus according to claim 1, wherein the mounting portion comprises through-holes for bolting it to the vehicle's chassis.

4. The apparatus according to claim 1, wherein the mounting portion is attachable to the vehicle's chassis by fasteners which extend parallel with an axis of rotation of the drive hub.

5. The apparatus according to claim 1, wherein the mounting portion is attachable to the chassis by fasteners arranged circumferentially around the drive hub.

6. The apparatus according to claim 5, wherein the fasteners are arranged approximately equidistantly around the drive hub.

7. The apparatus according to claim 1, wherein the mounting portion is in a form of a plate having an aperture therein extending to one edge of the plate, the drive hub projecting through the aperture with the mounting portion fitted to the vehicle chassis.

8. The apparatus according to claim 1, wherein the support arm is arranged such that it is off-set to one side of a centre-line passing vertically through the drive hub.

9. The apparatus according to claim 1, wherein the support arm is arranged such that it is off-set towards a front of the vehicle in front of a centre-line passing vertically through the drive hub.

10. The apparatus according to claim 1, wherein the support arm is arranged below the drive hub.

11. An articulated wheeled vehicle including apparatus arranged for converting it to an at least partially tracked vehicle by attachment of a continuous track unit, the vehicle comprising a drive hub of the type which is arranged to have an attachable wheel, the continuous track unit replacing the wheel to engage ground in use for movement of the vehicle, the apparatus comprising a mounting portion releasably attachable to a chassis of the vehicle, the mounting portion arranged to substantially surround the drive hub, a support arm for supporting the continuous track unit, and a drive sprocket releasably attachable to the drive hub for transferring torque from the drive hub to the continuous track unit so as to rotate a track in use with the wheel removed and the apparatus attached to the vehicle, wherein the support arm is arranged to fit into an idler carriage of the continuous track unit comprising tie-bars and to replace an existing tie-bar.

12. The vehicle according to claim 11, wherein the vehicle comprises two units articulated together with an articulated joint, and comprising rigid drive axles such that steering of the vehicle is effected by slewing the two units of the vehicle, separated by the articulation joint, relative to one another.

13. The vehicle according to claim 11, being arranged to lift and carry loads.

14. The vehicle according to claim 13, being a loader, a fork lift, a tele-handler, or a tool-carrier.

15. The vehicle according to claim 11, comprising a movable arm.

16. The vehicle according to claim 15, wherein the movable arm is telescopic.

17. The vehicle according to claim 11, having a weight less than 5 tonnes.

18. Apparatus arranged for converting a wheeled vehicle to a tracked vehicle by attachment of a continuous track unit, the vehicle comprising a drive hub which is arranged to have an attachable wheel, the continuous track unit replacing the wheel as the driving force of the vehicle, the apparatus comprising a first portion attachable to a chassis of the vehicle, the first portion arranged to substantially surround the drive hub, a second portion including a support arm for supporting the continuous track unit, the second portion releasably attachable to the first portion, and a drive sprocket releasably attachable to the drive hub for transferring torque from the drive hub to the continuous track unit so as to rotate a track in use with the wheel removed and the apparatus attached to the vehicle, wherein the apparatus is arranged such that once attached to the vehicle, the second portion and drive sprocket are removable, and a wheel is attachable to the drive hub with the first portion still attached to a support structure of the vehicle, wherein the support arm is arranged to fit into an idler carriage of the continuous track unit comprising tie-bars and to replace an existing tie-bar.

* * * * *